US010810955B2

(12) United States Patent
Huang

(10) Patent No.: US 10,810,955 B2
(45) Date of Patent: Oct. 20, 2020

(54) DATA ENCODING METHOD, DATA DECODING METHOD, AND DISPLAY DEVICE FOR IMPROVING COMMUNICATION RELIABILITY

(71) Applicant: InnoLux Corporation, Miao-Li County (TW)

(72) Inventor: Yung-Li Huang, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/371,093

(22) Filed: Mar. 31, 2019

(65) Prior Publication Data

US 2019/0340986 A1 Nov. 7, 2019

(30) Foreign Application Priority Data

May 2, 2018 (CN) .......................... 2018 1 0411341

(51) Int. Cl.
*G09G 3/36* (2006.01)
*G09G 5/00* (2006.01)

(52) U.S. Cl.
CPC ........... *G09G 3/3611* (2013.01); *G09G 5/006* (2013.01); *G09G 2310/08* (2013.01); *G09G 2370/08* (2013.01)

(58) Field of Classification Search
None
See application file for complete search history.

(56) References Cited

U.S. PATENT DOCUMENTS

| 5,974,464 | A | * | 10/1999 | Shin | G09G 5/006 709/231 |
| 7,102,629 | B2 | * | 9/2006 | Bae | G09G 5/006 345/204 |
| 7,999,802 | B2 | * | 8/2011 | Kim | G09G 3/2096 345/204 |
| 2006/0007093 | A1 | * | 1/2006 | La | G09G 3/3614 345/96 |
| 2006/0244707 | A1 | * | 11/2006 | Furihata | G09G 3/3648 345/98 |
| 2007/0160139 | A1 | * | 7/2007 | Vasquez | G06F 3/14 375/240.08 |
| 2008/0018506 | A1 | * | 1/2008 | Raveendran | G06T 5/40 341/51 |
| 2010/0164845 | A1 | * | 7/2010 | Takagi | G06F 3/1415 345/58 |

* cited by examiner

*Primary Examiner* — Dorothy Harris
(74) *Attorney, Agent, or Firm* — Winston Hsu

(57) ABSTRACT

A display device includes a display panel, a data driving unit, and a timing control unit. The display panel includes a plurality of data driving lines. The data driving unit is electrically coupled to the display panel for driving at least one part of the plurality of data driving lines. The timing control unit is disposed on a side of the display panel for processing a plurality of data vectors generated by a data source. The timing control unit includes an encoder module, a serializer module, and a data transmitter module. The encoder module is used for encoding a plurality of N bit data vectors to a plurality of N+m bit data vectors. The serializer module is electrically coupled to the encoder module for serializing the plurality of N+m bit data vectors. The data transmitter module is used for transmitting the plurality of serialized N+m bit data vectors to the data driving unit.

9 Claims, 8 Drawing Sheets

DATA ENCODING METHOD, DATA DECODING METHOD, AND DISPLAY DEVICE FOR IMPROVING COMMUNICATION RELIABILITY

BACKGROUND OF THE DISCLOSURE

1. Field of the Disclosure

The disclosure relates to a data encoding method, a data decoding method, and a display device, and more particularly, a data encoding method, a data decoding method, and a display device for improving communication reliability.

2. Description of the Prior Art

With advancement of technologies, a display device is required to support higher and higher displayed image size and image resolution. In recent years, a maximum image resolution supported by the display device is improved from Full High-Definition (FHD, 1920 by 1080 pixels) to Ultra High Definition (UHD, 3840 by 2160 pixels). In the future, the maximum image resolution supported by the display device will increase to 7680 by 4320 pixels (i.e., as 8K image resolution) or more than 8K image resolution. Since the displayed image size and maximum image resolution supported by the display device are increased, a high transmission frequency used for communicating image data has to be introduced. Therefore, on the premise of the high transmission frequency, a design challenge for a high image resolution-based display device is unavoidable since the high image resolution-based display device is required to provide satisfactory synchronization accuracy, high throughput, small interference and high integrity of the image data.

In general, most display devices use binary digital signals for performing data transmission. For example, image data stored in a data source can be outputted as a binary digital signal to the display device through a binary digital circuit (a bus or a wired cable) for displaying images. Particularly, the binary digital signal includes a plurality of low voltage (i.e., logic "0" bits) signals and a plurality of high voltage (i.e., logic "1" bits) signals. Compared with an analog signal, the binary digital signal inherently provides a larger decision region. Therefore, the binary digital signal is not easily interfered by the external environment. However, an asynchronous distortion of binary digital signal easily occurs, especially in high frequency data transmission. The reason is that when the binary digital signal includes a lot of consecutive voltage segments with the same voltage level (a lot of consecutive bits with the same logical state) during a certain time interval, the signal distortion may occur since frequency offset and sampling offset are unavoidable in a receiver. Moreover, after the binary digital signal during the certain interval is distorted, it is easy to affect an error rate of subsequent binary digital signal. In other words, an error propagation of the binary digital signal easily occurs. Therefore, to avoid transmitting a lot of consecutive voltage segments with the same voltage levels (or say, a lot of consecutive bits with the same logical state) during a transmission time interval of the binary digital signal is an important design issue.

SUMMARY OF THE DISCLOSURE

In an embodiment of the disclosure, a display device is illustrated. The display device comprises a display panel, a data driving unit, and a timing control unit. The display panel comprises a plurality of data driving lines. The data driving unit is electrically coupled to the display panel and configured to drive at least one part of the plurality of data driving lines. The timing control unit is disposed on a side of the display panel and configured to process a plurality of data vectors generated by a data source. The timing control unit comprises an encoder module, a data serializer module, and a data transmitter module. The encoder module is configured to encode a plurality of N bit data vectors to a plurality of N+m bit data vectors. N is an even integer greater than eight, and m is a positive odd integer. The data serializer module is electrically coupled to the encoder module and configured to serialize the plurality of N+m bit data vectors. The data transmitter module is electrically coupled to the data serializer module and the data driving unit and configured to transmit the plurality of serialized N+m bit data vectors to the data driving unit. When the display panel displays an image, the data driving unit drives the at least one part of the plurality of data driving lines according to the plurality of serialized N+m bit data vectors.

In another embodiment of the disclosure, a data encoding method is illustrated. The data encoding method comprises receiving a data vector with N bits, adding a redundant bit to the data vector, and acquiring complementary bits of a plurality of specific bits within the data vector after the redundant bit is added to the data vector in order to generate an encoded data vector. When the data vector comprises more than K consecutive bits with the same logical state, the redundant bit and a least significant bit of the data vector have the same logical state. The encoded data vector comprises N+1 bits. N is an even integer greater than eight. K is equal to $(N/2)+1$. The number of consecutive bits with the same logical state within the encoded data vector is no more than K.

In another embodiment of the disclosure, a data decoding method is illustrated. The data decoding method comprises receiving an encoded data vector with N+1 bits, acquiring complementary bits of a plurality of specific bits within the encoded data vector in order to generate a first complementary processed data vector when a least significant bit (LSB) and an adjacent bit of the LSB of the encoded data vector have the same logical state, and acquiring N bits following the least significant bit within the first complementary processed data vector in order to generate a decoded data vector. N is an even integer greater than eight.

These and other objectives of the disclosure will no doubt become obvious to those of ordinary skill in the art after reading the following detailed description of the embodiment that is illustrated in the various figures and drawings.

DETAILED DESCRIPTION

Figure 1:
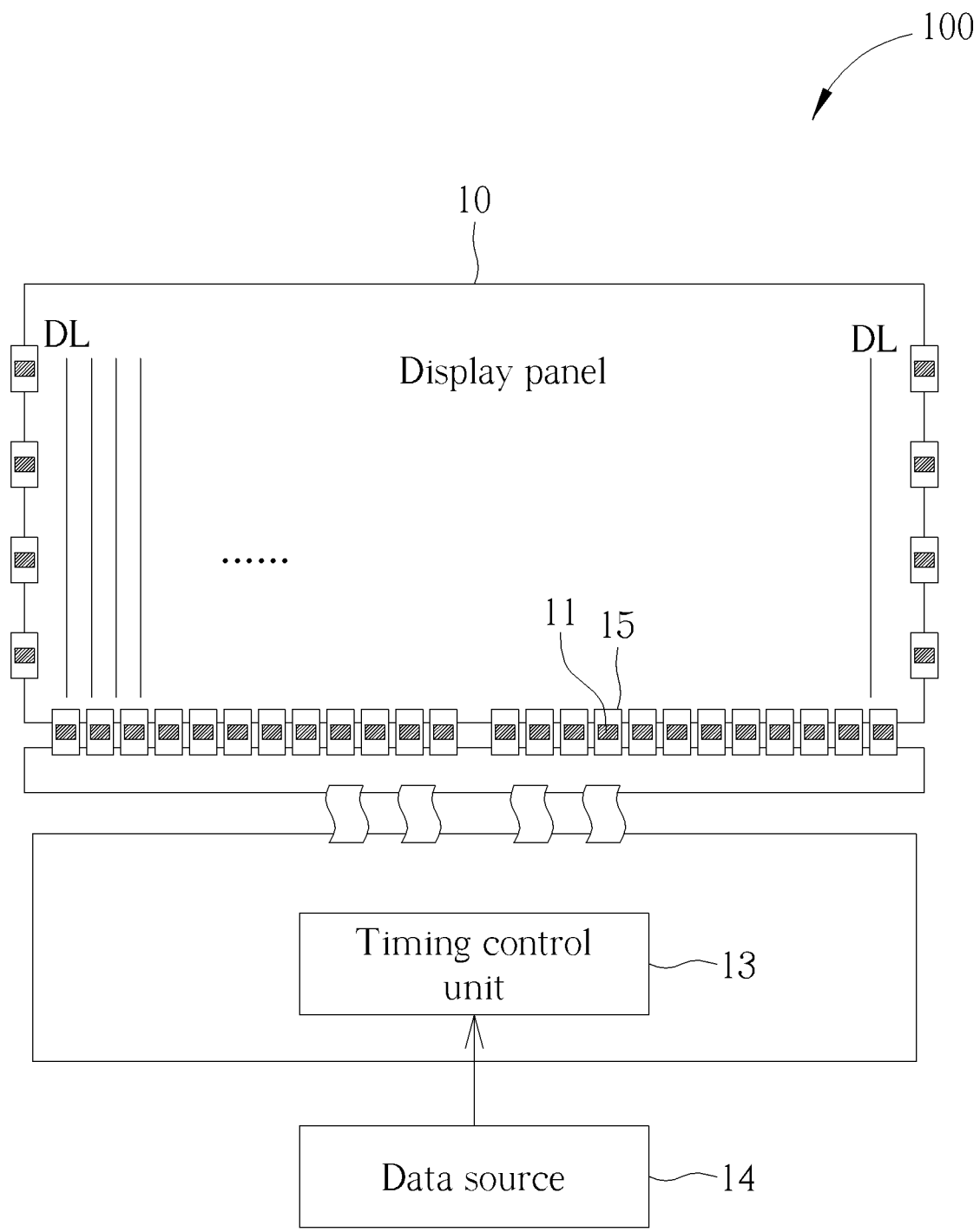
FIG. 1 is a structure of a display device according to an embodiment of the disclosure.

FIG. 1 is a structure of a display device 100 according to an embodiment of the disclosure. The display device 100 includes a display panel 10, a data driving unit 11, and a timing control unit 13. The display panel 10 includes a plurality of data driving lines DL. The display panel 10 can be a liquid-crystal display panel, an organic light-emitting diode display panel, a mini light-emitting diode display panel, a micro light-emitting diode display panel, an active-matrix organic light-emitting diode display panel, or any panel capable of displaying images. The plurality of data driving lines DL can be used for inputting data voltages to corresponding pixels in order to display images. The data driving unit 11 can be disposed on a film and electrically coupled to the display panel 10 for driving at least one part of the plurality of data driving lines DL, which is called as a Chip on Film (COF) unit 15. The data driving unit 11 can also be disposed on a substrate and electrically coupled to the display panel 10, which is called as a Chip on Glass (COG) unit. Here, the number of data driving units 11 and COF units 15 can be adjusted according to various image resolutions of the display panel 10. Also, the number of data driving channels can be adjusted according to user's requirements or configurations. Therefore, the number of data driving units 11 and COF units 15 can be adjusted according to a fixed image resolution of the display panel 10 or user's configurations. However, the number of data driving units 11 and the COF units 15 of the disclosure are not limited to associating with the image resolutions of the display panel 10 or user's configurations. Any reasonable hardware adjustment or modification falls into the scope of the disclosure. The timing control unit 13 is disposed on a side of the display panel 10 for processing a plurality of data vectors generated by a data source 14. The timing control unit 13 can be a T-Con circuit disposed inside the display device 100. The data source 14 can be any device capable of outputting video data, such as a computer, a tablet, a smartphone, or a media player. The display device 100 can also acquire the video data from its built-in memory for generating the plurality of data vectors. Any reasonable technology modification falls into the scope of the disclosure. When the display panel 10 displays an image, the data driving unit 11 can drive at least one part of the plurality of data driving lines DL. In the display device 100, the data driving unit 11 can include at least one receiver unit. Each receiver unit and the timing control unit 13 can be regarded as a pair-wised transceiver system. For simplicity, communications between the timing control unit 13 and a receiver unit of the data driving unit 11 are illustrated later.

Figure 2:
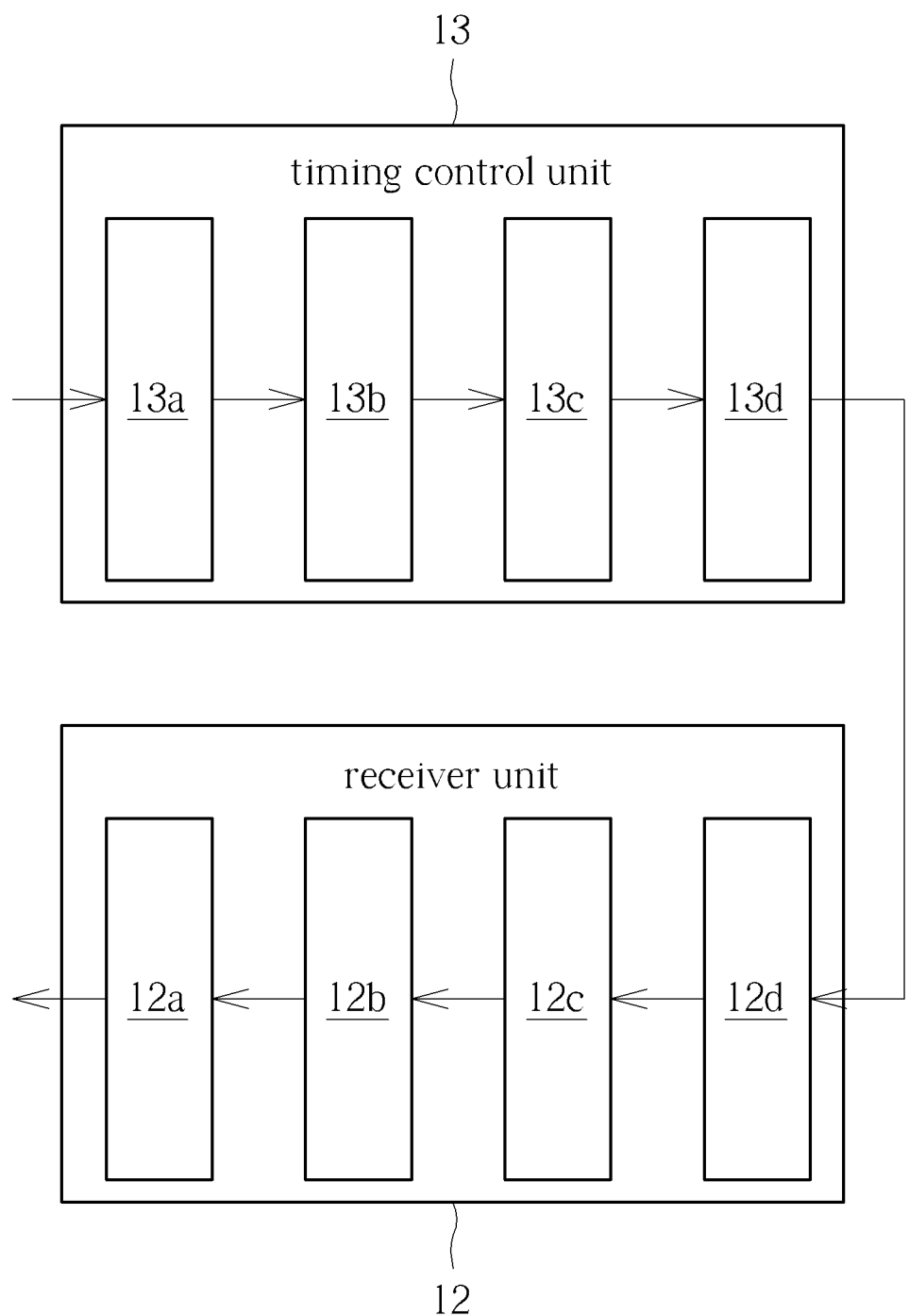
FIG. 2 is a block diagram of a timing control unit and a receiver unit disposed inside a data driving unit of the display device in FIG. 1.

FIG. 2 is a block diagram of the timing control unit 13 and a receiver unit 12 disposed inside the data driving unit 11 of the display device 100. The timing control unit 13 can include a data scrambler module 13a, an encoder module 13b, a data serializer module 13c, and a data transmitter module 13d. The data scrambler module 13a can be electrically coupled to the data source 14 for increasing a discrete degree of data generated by the data source 14. For example, the data scrambler module 13a can use at least one predetermined polynomial or at least one appropriate mathematical algorithm for scrambling bit allocations (allocation of each bit with logic "0" or logic "1") of each data vector generated by the data source 14 for increasing the discrete degree. The data scrambler module 13a can be electrically coupled to the encoder module 13b. However, the data scrambler module 13a can be regarded as an optional circuit. In other words, the data scrambler module 13a can be omitted in the display device 100 according to a requirement of design. The encoder module 13b is used for encoding a plurality of N bit data vectors to a plurality of N+m bit data vectors. N is an even integer greater than eight, and m is a positive odd integer. In the display device 100, the data source 14 can generate the data vectors. Elements of each data vector are binary values. Therefore, for the encoder module 13b, a data vector with N bits can be regarded as an input data vector. After the data vector with N bits is encoded by the encoder module 13b, the encoder module 13b can output an "encoded" data vector with N+m bits (i.e., N+m bit data vector). Equivalently, a coding rate of the encoder module 13b is equal to N/(N+m). For example, when N is equal to 10 and m is equal to one, for each data vector, the encoder module 13b can encode 10 bits for outputting 11 bits. Thus, the encoder module 13b can be operated under a high coding rate equal to 10/11. The data serializer module 13c is electrically coupled to the encoder module 13b for serializing the plurality of N+m bit data vectors. As previously mentioned, the encoder module 13b can encode each N bit data vector for outputting a corresponding N+m bit data vector. In order to generate a data stream, the data serializer module 13c can be introduced for serializing the plurality of N+m bit data vectors (i.e., regarded as "encoded" data vectors) to output the data stream. The data transmitter module 13d is electrically coupled to the data serializer module 13c and the receiver unit 12 disposed inside the data driving unit 11 for transmitting the plurality of serialized N+m bit data vectors to the receiver unit 12. The data transmitter module 13d can be regarded as a digital signal transmitter for transmitting the plurality of serialized N+m bit data vectors from the timing control unit 13 to the receiver unit 12. Therefore, the data driving unit 11 can drive the at least one part of the plurality of data driving lines DL according to the plurality of serialized N+m bit data vectors. However, any data transmission method of the data transmitter module 13d can be used. For example, the data transmitter module 13d can transmit data by using a data bus, a flexible print circuit, a wireless communication port, or a data connection port of any communication protocol.

The receiver unit 12 disposed inside the data driving unit 11 can include a data descrambler module 12a, a decoder module 12b, a data deserializer module 12c, and a data receiver module 12d. For convenience, components of the receiver unit 12 are illustrated based on an order of data receiving steps. The data receiver module 12d is electrically coupled to the data transmitter module 13d for receiving the plurality of serialized N+m bit data vectors transmitted from the data transmitter module 13d. In other words, the data receiver module 12d can be regarded as a digital signal receiver for receiving "encoded" and "serialized" data. The data deserializer module 12c is electrically coupled to the data receiver module 12d for deserializing the plurality of serialized N+m bit data vectors to generate a plurality of deserialized N+m bit data vectors. As previously mentioned, in order to convert the data stream received by the data receiver module 12d to a plurality of decodable data vectors, the data deserializer module 12c can be introduced for deserializing (or say, "vectorizing") the data stream to the plurality of deserialized N+m bit data vectors (i.e., which are encoded previously by the encoder module 13b). The decoder module 12b is electrically coupled to the data deserializer module 12c for decoding the plurality of deserialized N+m bit data vectors to the plurality of N bit data vectors. If decoding results are correct, the plurality of N bit data vectors outputted from the decoder module 12b and the plurality of N bit data vectors inputted to the encoder module 13b are equivalent. The data descrambler module 12a is electrically coupled to the decoder module 12b for performing a descrambling process to the plurality of N bit data vectors outputted from the decoder module 12b. For example, the data descrambler module 12a can use at least one predetermined polynomial or at least one appropriate mathematical algorithm for restoring bit allocations scrambled by the data scrambler module 13a. However, the data descrambler module 12a can be regarded as an optional circuit. In other words, when the data scrambler module 13a is omitted in the display device 100, the data descrambler module 12a can also be omitted. In FIG. 2, the data scrambler module 13a and the data descrambler module 12a can be pair-wised components. The encoder module 13b and the decoder module 12b can be pair-wised components. The data serializer module 13c and the data deserializer module 12c can be pair-wised components. The data transmitter module 13d and the data receiver module 12d can be pair-wised components. Briefly, data generated by the data source 14 can be gradually processed and encoded in the timing control unit 13. Then, the receiver unit 12 of the data driving unit 11 can be introduced for extracting raw data (i.e., data generated by the data source 14) by decoding data outputted from the timing control unit 13. Further, in the display device 100, since the discrete degree of the data outputted from the data transmitter module 13d is increased, the chance of having a lot of consecutive bits with the same logical state is very low (approximately equal to zero). Therefore, the display device 100 is suitable for applying to a display with a large size or high resolution. The display device 100 can also support to transmit data in a high frequency and a high transmission rate without severe signal distortion. A data encoding method and a data decoding method performed by the display device 100 are illustrated below.

Figure 3:
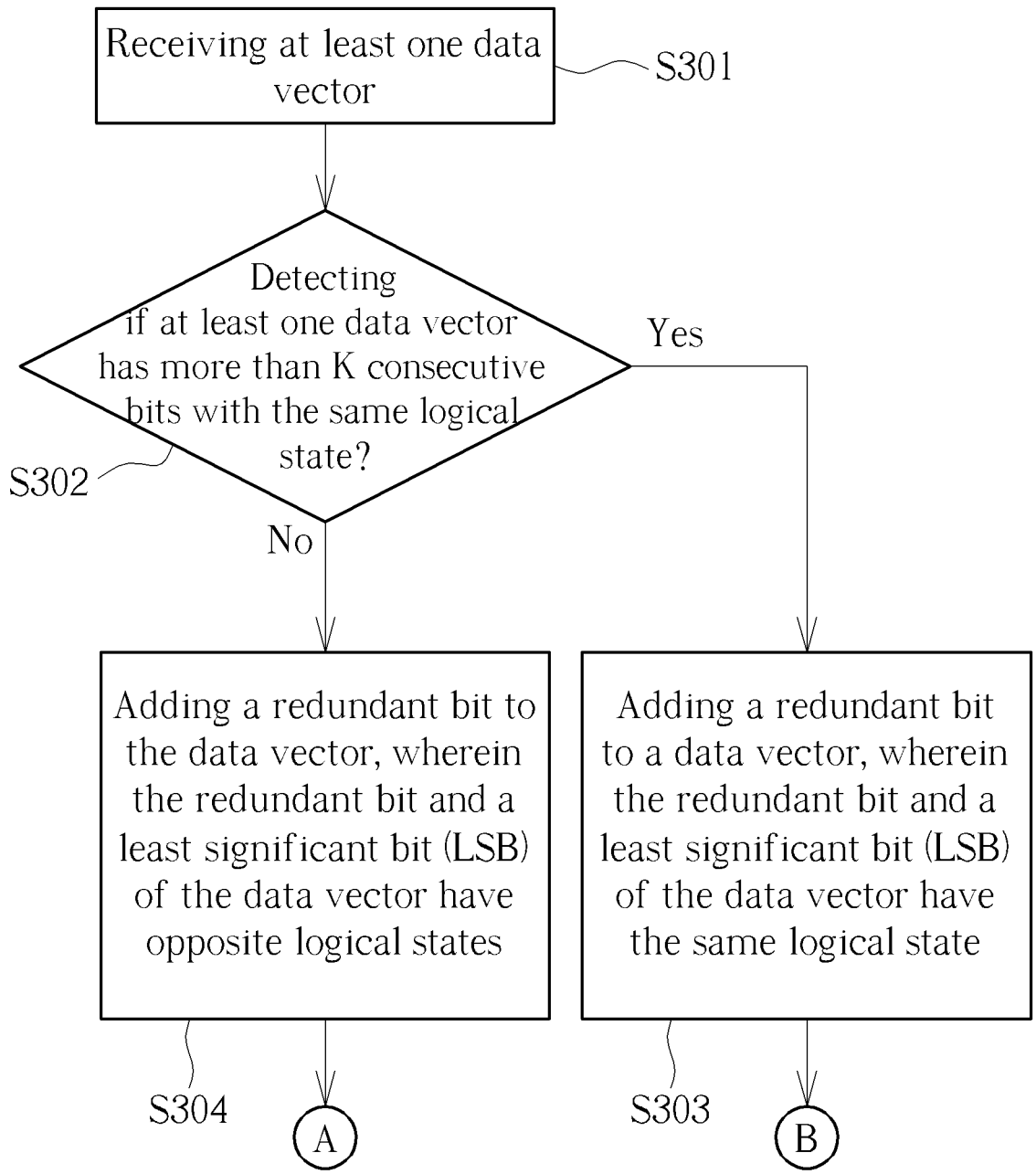
FIG. 3 is a flow chart of a first encoding stage performed by an encoder module of the display device in FIG. 1.
Figure 4:
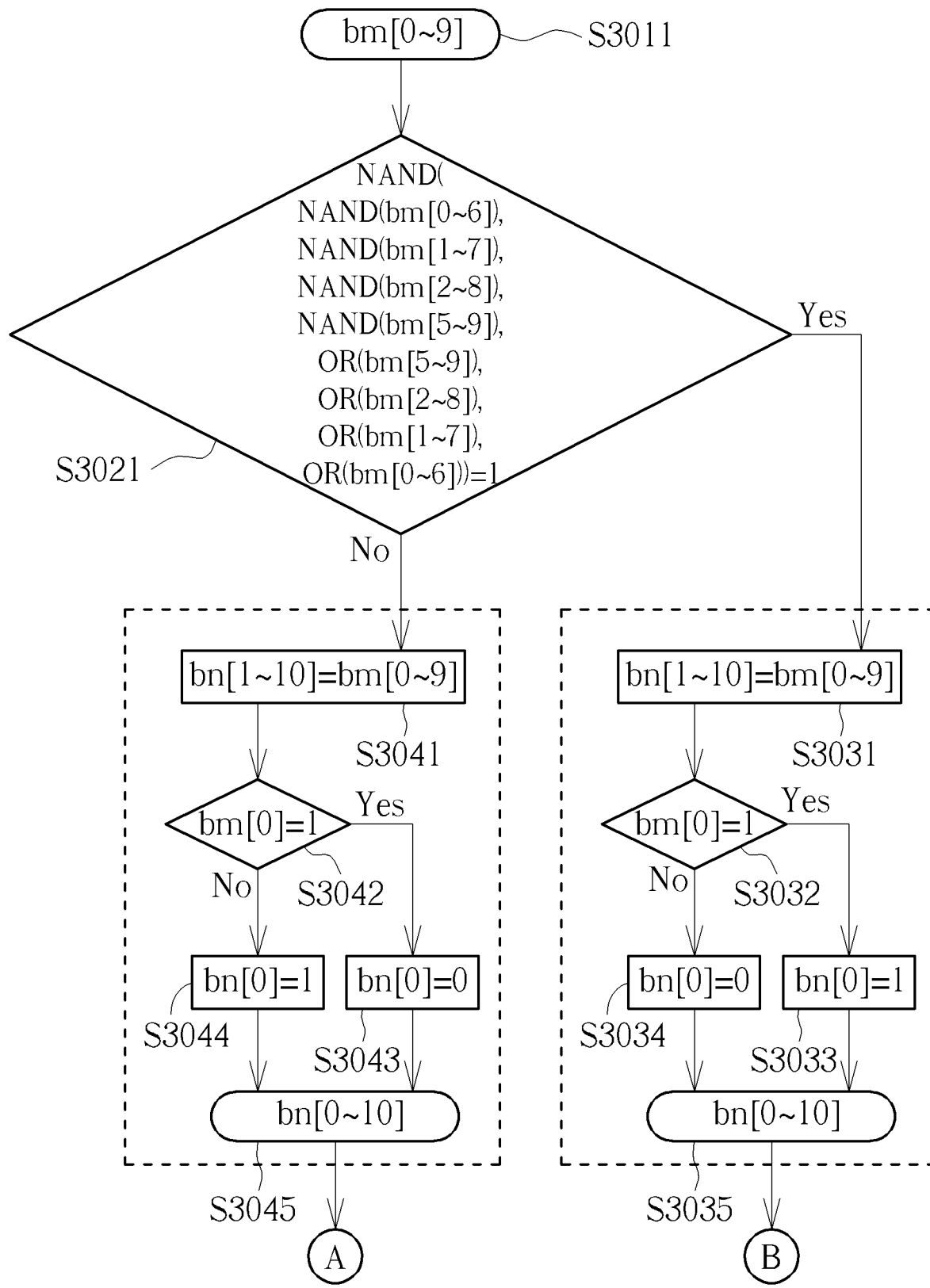
FIG. 4 is an implement illustration of the flow chart of the first encoding stage in FIG. 3.

FIG. 3 is a flow chart of a first encoding stage performed by the encoder module 13b of the display device 100. FIG. 4 is an implement illustration of the flow chart of the first encoding stage in FIG. 3. The first encoding stage performed by the encoder module 13b includes step S301 to step S304. Any technology modification falls into the scope of the disclosure. Step S301 to step S304 are illustrated below.

step S301: receiving at least one data vector;
step S302: detecting if at least one data vector has more than K consecutive bits with the same logical state? if so, executing step S303, else executing step S304;
step S303: adding a redundant bit to a data vector, wherein the redundant bit and a least significant bit (LSB) of the data vector have the same logical state.
step S304: adding a redundant bit to the data vector, wherein the redundant bit and a least significant bit (LSB) of the data vector have opposite logical states.

Referring to FIG. 3 and FIG. 4, in step S301, the encoder module 13b receives at least one data vector. Each data vector includes N bits. For example, in step S3011 of FIG. 4, a received data vector can include 10 bits, denoted as bm[0~9]. In the following, in step S302, the encoder module 13b detects if at least one data vector has more than K consecutive bits with the same logical state. For example, in step S3021 of FIG. 4, the encoder module 13b can use a plurality of logic gates for detecting if the data vector bm[0~9] has more than K consecutive bits with the same logical state. Further, in step S3021, a plurality of detection intervals can be introduced. For example, a detection interval from $0^{th}$ to $6^{th}$ bits of the data vector bm[0~9] can be introduced, denoted as bm[0~6]. A detection interval from $1^{st}$ to $7^{th}$ bits of the data vector bm[0~9] can be introduced, denoted as bm[1~7]. A detection interval from $2^{nd}$ to $8^{th}$ bits of the data vector bm[0~9] can be introduced, denoted as bm[2~8]. A detection interval from $5^{th}$ to $9^{th}$ bits of the data vector bm[0~9] can be introduced, denoted as bm[5~9]. "Negative-AND (NAND)" logic gates and "OR" logic gates can be used for detecting a logical event within a specific detection interval. For example, when all bits of bm[0~6] are logic "1" bits, an output of NAND (bm [0~6]) is equal to "0" (logic "0" output). An output of OR(bm[0~6]) is equal to "1" (logic "1" output). Conversely, when all bits of bm[0~6] are logic "0" bits, the output of NAND(bm[0~6]) is equal to "1" (logic "1" output). The output of OR(bm[0~6]) is equal to "0" (logic "0" output). In other words, when all bits in one detection interval have the same logical state, the output of NAND logic gate and the output of OR logic gate will have opposite logical states. However, when all bits in one detection interval do not all have the same logical state, the output of NAND logic gate and the output of OR logic are both equal to "1" (logic "1" outputs). Therefore, in step S3021 of FIG. 4, when bits of the data vector in each detection interval of the detection intervals (bm[0~6], bm[1~7], bm[2~8], and bm[5~]) do not all have the same logical state, the output of NAND logic gate and the output of OR logic corresponding to the each detection interval are equal to "1". Therefore, an output of an "outermost" NAND logic gate is equal to "0" (logic "0" output). Therefore, the "outermost" NAND logic gate with logic "0" output implies that the data vector bm[0~9] does not have more than K consecutive bits with the same logical state. Here, K can be equal to six. Conversely, in step S3021 of FIG. 4, when bits of the data vector in at least one detection interval of the detection intervals (bm[0~6], bm[1~7], bm[2~8], and bm[5~9]) all have the same logical state, the output of the "outermost" NAND logic gate is equal to "1" (logic "1" output), implying that the data vector bm[0~9] has more than K consecutive bits with the same logical state. Further, the detection interval bm[5~9] can be used for pre-detecting if the data vector bm[0~9] has more than K consecutive bits with the same logical state before a next data vector (i.e., bm+1) following the detection interval bm[5~9] is introduced. In the disclosure, K can be equal to (N/2)+1. For example, in FIG. 4, N is equal to 10. K is equal to (10/2)+1=6.

When the received data vector has more than K consecutive bits with the same logical state, according to step S303, the redundant bit is introduced to the data vector. Further, the redundant bit and the LSB of the data vector have the same logical state. For example, in step S3031 to step S3035 of FIG. 4, a redundant bit bn[0] is introduced to the data vector bm[0~9] with 10 bits. When the LSB of the data vector (i.e., denoted as "bm[0]") is a bit with logic "1", the redundant bit bn[0] can be designed as a bit with logic "1". When the LSB of the data vector (i.e., denoted as "bm[0]") is a bit with logic "0", the redundant bit bn[0] can be designed as a bit with logic "0". Therefore, after the data vector bm[0~9] is processed by introducing the redundant bit bn[0] according to step S3031 to step S3035, the LSB bm[0] of the data vector bm[0~9] and the redundant bit bn[0] have the same logical state. In other words, in step S303, the data vector with the redundant bit includes N+1 bits. N bits of N+1 bits can be regarded as the "original" data. The redundant bit and the LSB of the data vector have the same logical state. Conversely, when the received data vector does not have more than K consecutive bits with the same logical state, according to step S304, the redundant bit is introduced to the data vector. Further, the redundant bit and the LSB of the data vector have opposite logical states. For example, in step S3041 to step S3045 of FIG. 4, a redundant bit bn[0] is introduced to the data vector bm[0~9] with 10 bits. When the LSB of the data vector (i.e., denoted as "bm[0]") is a bit with logic "1", the redundant bit bn[0] can be designed as a bit with logic "0". When the LSB of the data vector (i.e., denoted as "bm[0]") is a bit with logic "0", the redundant bit bn [0] can be designed as a bit with logic "1". Therefore, after the data vector bm[0~9] is processed by introducing the redundant bit bn[0] according to step S3041 to step S3045, the LSB bm[0] of the data vector bm[0~9] and the redundant bit bn[0] have opposite logical states. In other words, in step S304, the data vector with the redundant bit would have N+1 bits. N bits of N+1 bits can be regarded as the "original" data. The redundant bit and the LSB of the data vector have opposite logical states. Here, the LSB can be defined as a bit with a smallest index of the data vector, such as bm[0]. However, any reasonable technology modification falls into the scope of the disclosure. For example, a bit allocation order of the data vector bm[0~9] can be arbitrarily scrambled or adjusted in other embodiments.

Figure 5:
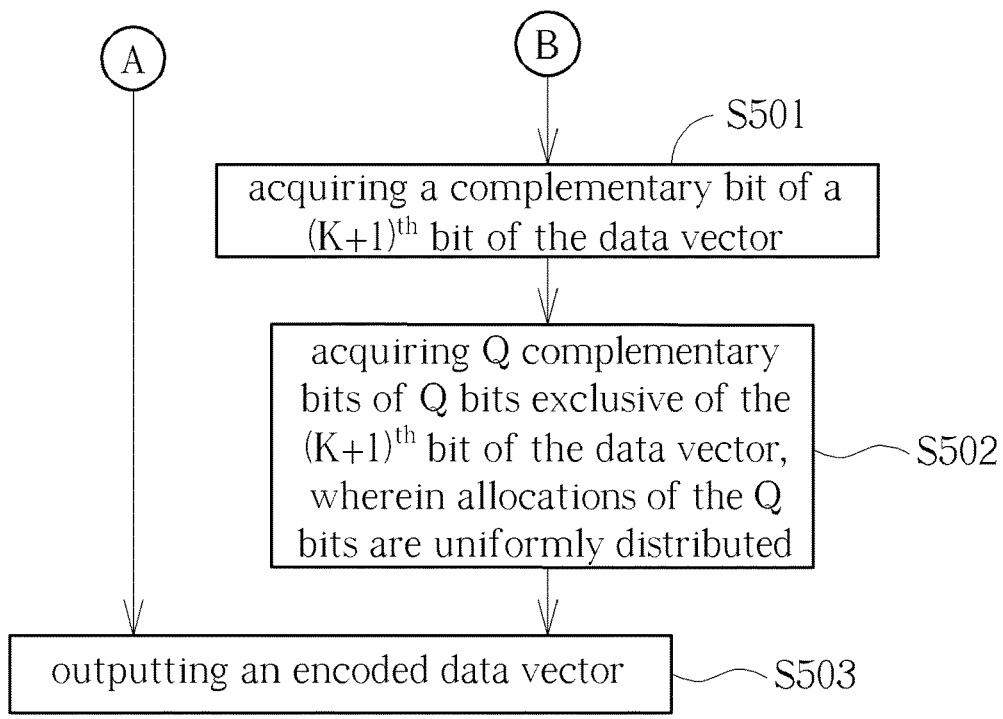
FIG. 5 is a flow chart of a second encoding stage performed by the encoder module of the display device in FIG. 1.
Figure 6:
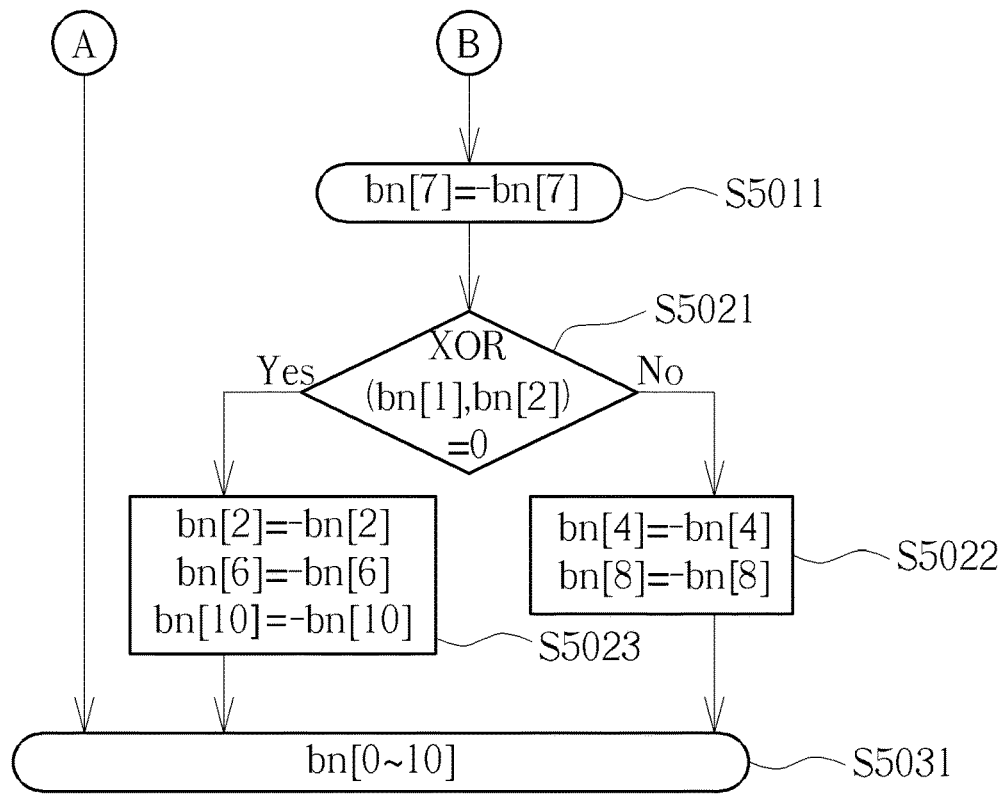
FIG. 6 is an implement illustration of the flow chart of the second encoding stage in FIG. 5.

FIG. 5 is a flow chart of a second encoding stage performed by the encoder module 13b of the display device 100. FIG. 6 is an implement illustration of the flow chart of the second encoding stage in FIG. 5. The second encoding stage performed by the encoder module 13b includes step S501 to step S503. Any technology modification falls into the scope of the disclosure. Step S501 to step S503 are illustrated below.

step S501: acquiring a complementary bit of a $(K+1)^{th}$ bit of the data vector;

step S502: acquiring Q complementary bits of Q bits exclusive of the $(K+1)^{th}$ bit of the data vector, wherein allocations of the Q bits are uniformly distributed;

step S503: outputting an encoded data vector.

Referring to FIG. 5 and FIG. 6, step S501 can be regarded as a next step of step S303. In step S501, the encoder module 13b can acquire the complementary bit of the $(K+1)^{th}$ bit of the data vector. K can be equal to (N/2)+1. For example, in step S5011 of FIG. 6, the data vector with the redundant bit can be denoted as bn[0~10]. The encoder module 13b can acquire a complementary bit of the $7^{th}$ bit, denoted as bn[7]=−bn[7]. Here, a "complementary" operation can be defined as one's complement operation of a binary number. For example, after the complementary operation is performed, a bit with logic "1" becomes a bit with logic "0". A bit with logic "0" becomes a bit with logic "1". As previously mentioned, the detection intervals bm[0~6], bm[1~7], bm[2~8], and bm[5~9] are processed by the encoder module 13b. When all bits of at least one of the detection intervals bm[0~6], bm[1~7], bm[2~8], and bm[5~9] have the same logical state, the complementary operation of the $7^{th}$ bit bn[7] (or say "bm[6]") is performed. After the $7^{th}$ bit becomes the complementary bit, since the complementary bit is located on an intersection bit address of detection intervals bm[0~6], bm[1~7], bm[2~8], and bm[5~9], the chance of having consecutive bits with the same logical state within at least one of the detection intervals bm[0~6], bm[1~7], bm[2~8], and bm[5~9] can be reduced. In the following, in step S502, the encoder module 13b can acquire the Q complementary bits of the Q bits exclusive of the $(K+1)^{th}$ bit of the data vector. Allocations of the Q bits are uniformly distributed. For example, in step S5021 to step S5023 of FIG. 6, the encoder module 13b can use exclusive-OR (hereafter say, "XOR") logic gate for detecting if bn[1] and bn[2] have the same logical state. If bn[1] and bn[2] have opposite logical states, an output of the XOR gate is equal to "1" (logic "1"). Then, a bit bn[4] and a bit bn[8] become complementary bits (i.e., Q=2). If the bn[1] and the bn[2] have the same logical state, the output of the XOR gate is equal to "0" (logic "0"). Then, a bit bn[2], a bit bn[6], and a bit bn[10] become complementary bits (i.e., Q=3). Allocations of the bit bn[2], the bit bn[6], and the bit bn[10] are uniformly distributed. However, the disclosure is not limited to locations of the Q complementary bits. Q can be a positive integer smaller than or equal to (K/2). In step S503, the encoder module 13b can output the encoded data vector. For example, in step S5031 of FIG. 6, the encoder module 13b can output the encoded data vector with 11 bits, denoted as bn[0~10].

Briefly, in FIG. 5 and FIG. 6, when the data vector includes more than K consecutive bits with the same logical state, the redundant bit can be added to the data vector. Then, some complementary bits of a plurality of specific bits within the data vector are acquired after the redundant bit is added to the data vector in order to generate the encoded data vector. Therefore, the encoded data vector would have N+1 bits. N is an even integer greater than eight. The number of consecutive bits with the same logical state within the encoded data vector is no more than K. Conversely, when the data vector includes no more than K consecutive bits with the same logical state, the redundant bit can be added to the data vector. Then, the encoder module 13b can directly output a data vector with the redundant bit. In other words, after the encoder module 13b preforms an encoding operation for generating the encoded data vector, a coding rate is equal to N/(N+1). For example, when N is equal to 10, the encoder module 13b has an input with a throughput equal to 10 bits and an output with a throughput equal to 11 bits.

Figure 7:
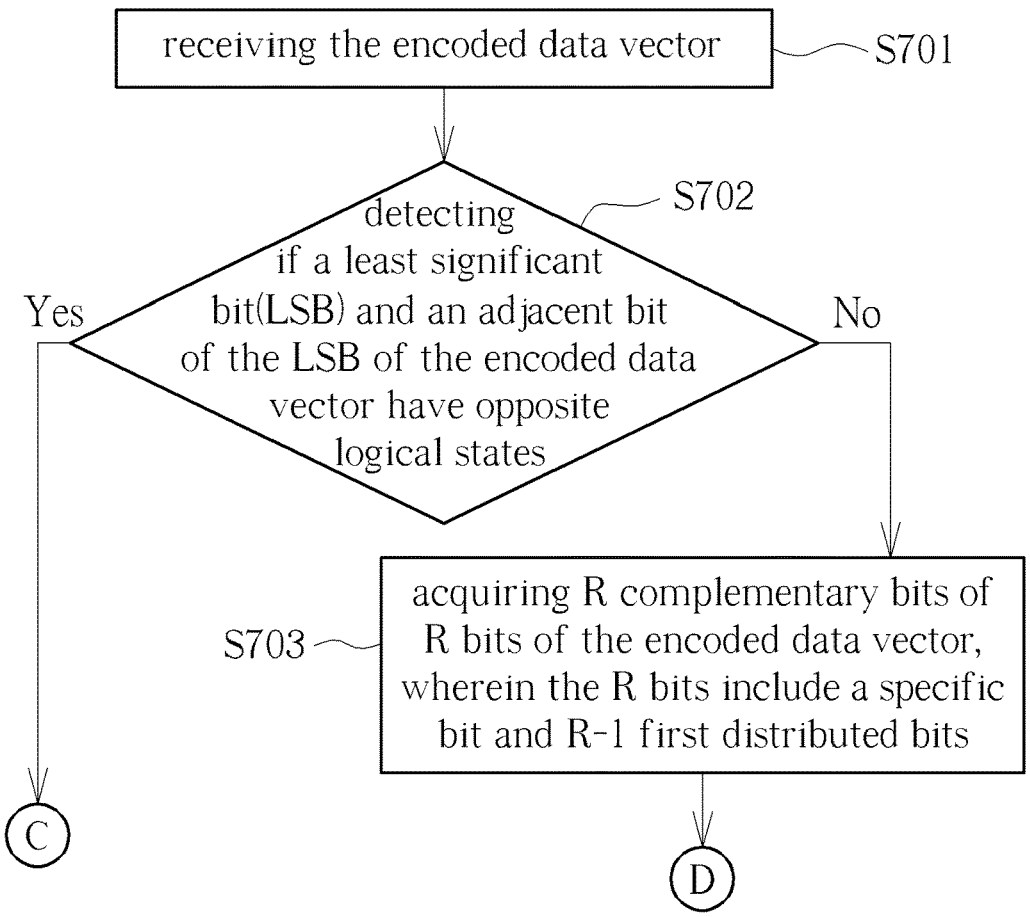
FIG. 7 is a flow chart of a first decoding stage performed by a decoder module of the display device in FIG. 1.
Figure 8:
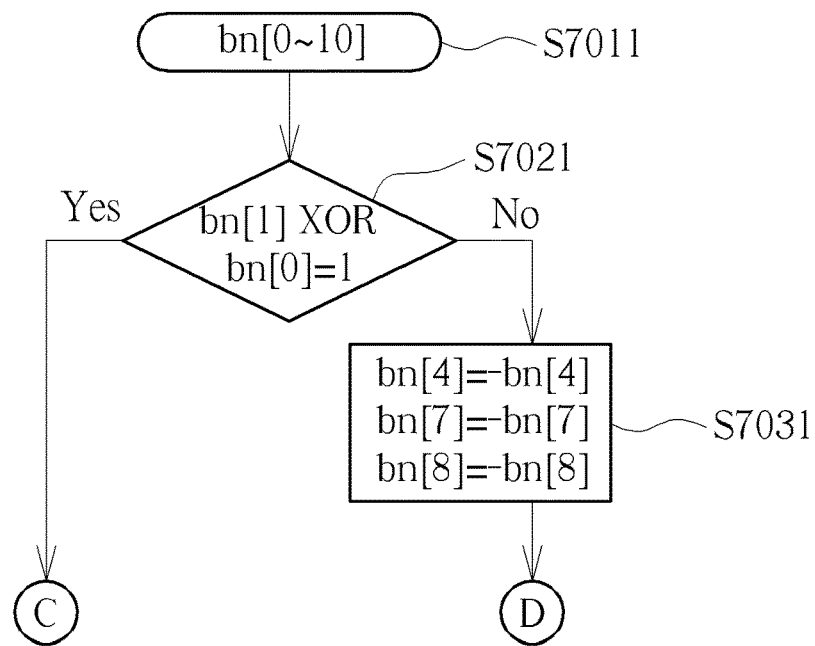
FIG. 8 is an implement illustration of the flow chart of the first decoding stage in FIG. 7.
Figure 9:
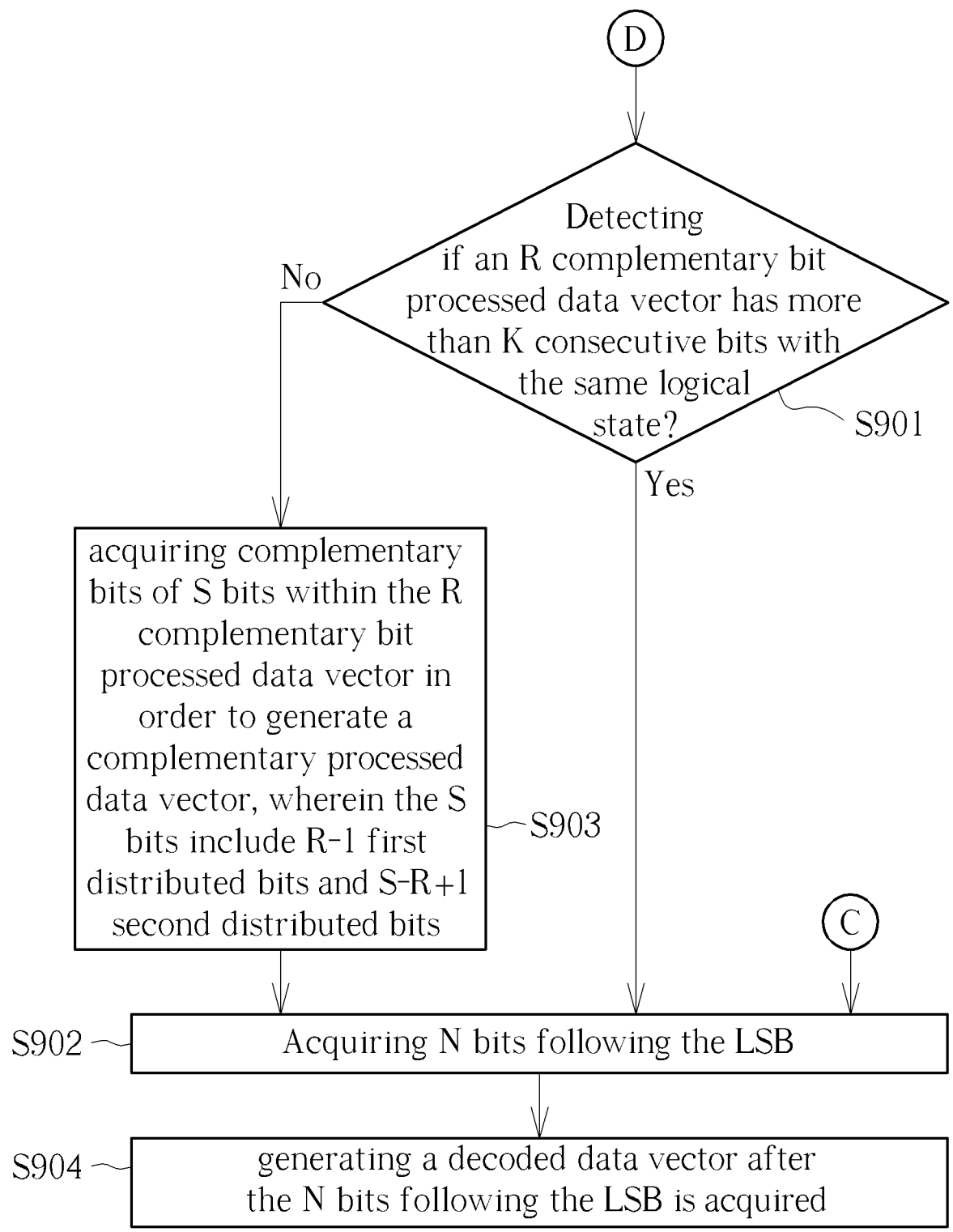
FIG. 9 is a flow chart of a second decoding stage performed by the decoder module of the display device in FIG. 1.

FIG. 7 is a flow chart of a first decoding stage performed by a decoder module 12b of the display device 100. FIG. 8 is an implement illustration of the flow chart of the first decoding stage in FIG. 7. The first decoding stage performed by a decoder module 12b includes step S701 to step S703. Any technology modification falls into the scope of the disclosure. Step S701 to step S703 are illustrated below.

step S701: receiving the encoded data vector;

step S702: detecting if a least significant bit (LSB) and an adjacent bit of the LSB of the encoded data vector have opposite logical states? if so, executing step S902 in FIG. 9, else executing step S703;

step S703: acquiring R complementary bits of R bits of the encoded data vector, wherein the R bits include a specific bit and R−1 first distributed bits.

Referring to FIG. 7 and FIG. 8, in step S701, the decoder module 12b receives the encoded data vector. For example, in step S7011 of FIG. 8, the decoder module 12b receives the encoded data vector with 11 bits, denoted as bn[0~10]. In the following, in step S702, the decoder module 12b can detect if the LSB and the adjacent bit of the LSB of the encoded data vector have opposite logical states. For example, in step S7021 of FIG. 8, the decoder module 12b can use an XOR logic gate for detecting if the LSB bn[0] and the adjacent bit of the LSB (bn[1]) have opposite logical states. If an output of the XOR logic gate is "1" (logic "1"), it implies that the LSB bn[0] and the adjacent bit of the LSB (bn[1]) have opposite logical states. Therefore, corresponding to the encoding method of step S304, the number of consecutive bits with the same logical state within the data vector (original) is no more than K. Conversely, if the output of the XOR logic gate is "0" (logic "0"), it implies that the LSB bn[0] and the adjacent bit of the LSB (bn[1]) have the same logical state. Therefore, corresponding to the encoding method of step S303, the number of consecutive bits with the same logical state within the data vector (original) is more than K. Here, if the LSB bn[0] and the adjacent bit of the LSB (bn[1]) have opposite logical states, the decoder module 12b can directly execute step S902 of a second decoding stage (in FIG. 9). The second decoding stage is illustrated later. If the LSB bn[0] and the adjacent bit of the LSB (bn[1]) have the same logic state, according to step S703, the decoder module 12b can acquire R complementary bits of R bits of the encoded data vector. The R bits include a specific bit and R−1 first distributed bits. For example, in step S7031, if the LSB bn[0] and the adjacent bit of the LSB (bn[1]) have the same logical state, a bit bn[4], a bit bn[7], and a bit bn[8] become complementary bits by using the decoder module 12b. Performing the complementary operations of the bit bn[4], the bit bn[7], and the bit bn[8] by using the decoder module 12b can be regarded to restore previously changes of the complementary operations of the bit bn[4], the bit bn[7] by the encoder module 13b in steps S5011 to S5022. Here, R is equal to three. The three complementary bits include the $(K+1)^{th}$ bit (i.e., say, the bit bm[6] of the data vector or the bit bn[7] of the encoded data vector), and two first distributed bits, such as a bit bn[4] and a bit bn[8].

Figure 10:
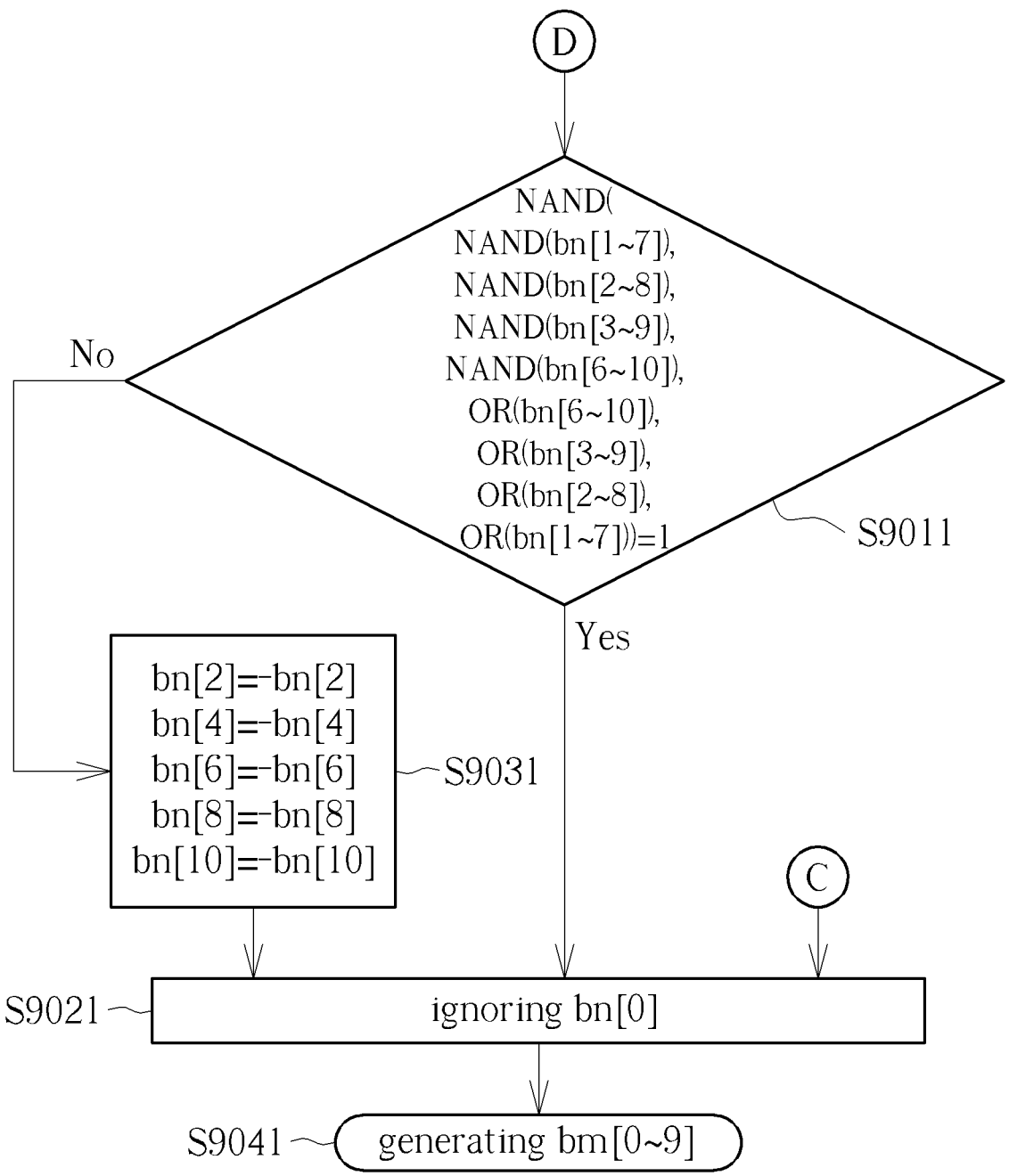
FIG. 10 is an implement illustration of the flow chart of the second decoding stage in FIG. 9.

FIG. 9 is a flow chart of a second decoding stage performed by the decoder module 12b of the display device 100. FIG. 10 is an implement illustration of the flow chart of the second decoding stage in FIG. 9. The second decoding stage performed by the decoder module 12b includes step S901 to step S904. Any technology modification falls into the scope of the disclosure. Step S901 to step S904 are illustrated below.

step S901: detecting if an R complementary bit processed data vector has more than K consecutive bits with the same logical state? if so, executing step S902, else executing step S903;

step S902: acquiring N bits following the LSB;

step S903: acquiring complementary bits of S bits within the R complementary bit processed data vector in order to generate a complementary processed data vector, wherein the S bits include R−1 first distributed bits and S−R+1 second distributed bits;

step S904: generating a decoded data vector after the N bits following the LSB is acquired.

Referring to FIG. 9 and FIG. 10, step S901 can be regarded as a next step of step S703. In step S901, the decoder module 12b can detect if the R complementary bit processed data vector has more than K consecutive bits with the same logical state. Here, the "R complementary bit processed data vector" can be regarded as an output data vector processed in step S7031 of FIG. 8. Further, operations in step S901 can be implemented by using several logic gates in step S9011 of FIG. 10 for detecting if the R complementary bit processed data vector has more than K consecutive bits with the same logical state. Similar to the detection method in step S3021, several detection intervals can be introduced. For example, a detection interval from the $1^{th}$ to $7^{th}$ bits of the R complementary bit processed data vector can be introduced, denoted as bn[1~7]. A detection interval from the $2^{nd}$ to $8^{th}$ bits of the R complementary bit processed data vector can be introduced, denoted as bn[2~8]. A detection interval from the $3^{rd}$ to $9^{th}$ bits of the R complementary bit processed data vector can be introduced, denoted as bn[3~9]. A detection interval from the $6^{th}$ to $10^{th}$ bits of the R complementary bit processed data vector can be introduced, denoted as bn [6~10]. In the embodiment, operations in step S9011 and operations in step S3021 are similar (or say, substantially equivalent). Since the redundant bit is introduced in step S9011, bit indices in step S9011 are shifted by one compared with bit indices in step S3021. Further, details of using the NAND logic gates and the OR logic gates for detecting logical states of consecutive bits are illustrated previously. Thus, they are omitted here. If the R complementary bit processed data vector has more than K consecutive bits with the same logical state, it implies that decoding results are correct. Therefore, in step S902, the decoder module 12b can acquire the N bits following the LSB. For example, in step S9021 of FIG. 10, the decoder module 12b can directly output the decoding results by ignoring the LSB (i.e., denoted as bn[0]). The reason is that the LSB bn[0] belongs to the redundant bit and thus lacks of bearing data information. However, in step S702 of FIG. 7 previously mentioned, if the LSB and the adjacent bit of the LSB of the encoded data vector have opposite logical states, the decoder module 12b can execute step S902 of the second decoding stage in FIG. 9. In other words, when the decoder module 12b detects that the encoded data vector has no more than K consecutive bits with the same logical state, step S9021 can be performed for outputting a decoding vector by ignoring the redundant bit previously introduced.

In step S901, if the R complementary bit processed data vector has no more than K consecutive bits with the same logical state, it implies that decoding results cannot be directly outputted. Therefore, the decoder module 12b can execute step S903 for acquiring complementary bits of S bits within the R complementary bit processed data vector. The S bits include the R−1 first distributed bits and the S−R+1 second distributed bits. For example, in step S9031 of FIG. 10, the decoder module 12b can acquire complementary bits of bits bn[2], bn[4], bn[6], bn[8], and bn[10]. Here, S is equal to five. The reason of acquiring complementary bits of bits bn[4] and bn[8] (denoted as the first distributed bits) is that the bits bn[4] and bn[8] are previously processed by using "unnecessary" complementary step. Therefore, in step S9031, five bits (bn[2], bn[4], bn[6], bn[8], and bn[10]) can be partitioned into the first distributed bits (bn[4] and bn[8], operated under a complementary process for restoring their values), and a second distributed bits (bn[2], bn[6], and bn[10]). Here, R is equal to 3. S is equal to 5. Therefore, the number of second distributed bits (bn[2], bn[6], and bn[10]) is equal to S−R+1=3. In the disclosure, K can be equal to (N/2)+1. S and R are two positive integers and S>R, R<N. Further, an operation of acquiring the complementary bits of the second distributed bits (bn[2], bn[6], and bn[10]) can be regarded as an operation of restoring their complementary values in step S5023 of FIG. 6. In other words, when the decoder module 12b detects that the decoding results cannot be outputted directly according to step S901 (corresponding to step S9011), the decoder module 12b can perform a complementary process for correcting some values of bits. Further, the decoder module 12b can restore some bits with complementary values generated in step S5023. Further, in step S904, the decoder module 12b can output the decoding data vector, denoted as bm[0~9] in step S9041. The decoding data vector bm[0~9] includes 10 bits corresponding to the "original" data vector.

Briefly, the decoder module 12b can acquire complementary bits of a plurality of specific bits within the encoded data vector in order to generate the complementary processed data vector. The operation of acquiring complementary bits of the plurality of specific bits can be regarded to an operation of converting complementary bits previously generated to the original bits by the encoder module 13b. The complementary processed data vector includes a decoded data vector and a redundant bit. By ignoring the redundant bit, the decoder module 12b can output the decoded data vector corresponding to "original" binary data vector with N bits.

To sum up, the disclosure illustrates a data encoding method, a data decoding method, and a display device for improving communication reliability. Since the high coding rate (i.e., N/(N+m), N is an even integer greater than eight and m is a positive odd integer) can be supported by the display device, high data transmission rate can be provided. Further, since the encoder module of the display device can increase the discrete degree of the data vector by decreasing or avoiding a chance of having consecutive bits with the same logical state within the encoded data vector, the display device can mitigate signal distortion under high frequency signal transmission modes. Therefore, for high image resolution and high display size requirements, the display device of the disclosure is suitable for applying to current display design, even future display design trends.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device comprising:
   a display panel comprising a plurality of data driving lines;
   a data driving unit electrically coupled to the display panel and configured to drive at least one part of the plurality of data driving lines; and
   a timing control unit disposed on a side of the display panel and configured to process a plurality of data vectors generated by a data source, the timing control unit comprising:
      an encoder module configured to encode a plurality of N bit data vectors to a plurality of N+m bit data vectors, wherein N is an even integer greater than eight, and m is a positive odd integer;
      a data serializer module electrically coupled to the encoder module and configured to serialize the plurality of N+m bit data vectors; and
      a data transmitter module electrically coupled to the data serializer module and the data driving unit and configured to transmit the plurality of serialized N+m bit data vectors to the data driving unit;
   wherein when the display panel displays an image, the data driving unit drives the at least one part of the plurality of data driving lines according to the plurality of serialized N+m bit data vectors.

2. The display device of claim 1, wherein the data driving unit further comprises a data receiver module, the data receiver module is electrically coupled to the data transmitter module and configured to receive the plurality of serialized N+m bit data vectors transmitted from the data transmitter module.

3. The display device of claim 2, wherein the data driving unit further comprises a data deserializer module, the data deserializer module is electrically coupled to the data receiver module and configured to deserialize the plurality of serialized N+m bit data vectors.

4. The display device of claim 3, wherein the data driving unit further comprises a decoder module electrically coupled to the data deserializer module and configured to decode the plurality of deserialized N+m bit data vectors to the plurality of N bit data vectors.

5. The display device of claim 4, wherein the data driving unit further comprises a data descrambler module electrically coupled to the decoder module.

6. The display device of claim 5, wherein the timing control unit further comprises a data scrambler module electrically coupled to the encoder module.

7. The display device of claim 6, wherein the data scrambler module is configured to scramble bit allocations of the plurality of data vectors according to a predetermined polynomial.

8. The display device of claim 1, wherein the display panel is a liquid-crystal display panel, a mini light-emitting-diode display panel, a micro light-emitting-diode display panel, or an active-matrix organic light-emitting diode display panel.

9. The display device of claim 1, wherein the data driving unit is a Chip on Film (COF) unit or a Chip on Glass (COG) unit.

* * * * *